US006991572B2

(12) United States Patent
Chung (10) Patent No.: US 6,991,572 B2
(45) Date of Patent: Jan. 31, 2006

(54) DIFFERENTIAL LOCKING MECHANISM FOR A DRIVE AXLE ASSEMBLY

(75) Inventor: I-Chao Chung, Troy, MI (US)

(73) Assignee: AxleTech International IP Holdings, LLC, Troy, MI (US)

( * ) Notice: Subject to any disclaimer, the term of this patent is extended or adjusted under 35 U.S.C. 154(b) by 165 days.

(21) Appl. No.: 10/771,977

(22) Filed: Feb. 4, 2004

(65) Prior Publication Data

US 2004/0185983 A1 Sep. 23, 2004

Related U.S. Application Data (60) Provisional application No. 60/445,171, filed on Feb. 4, 2003.

(51) Int. Cl.
*F16H 48/20* (2006.01)

(52) U.S. Cl. .......................................... 475/86; 475/231
(58) Field of Classification Search .................. 475/86, 475/231, 239
See application file for complete search history.

(56) References Cited

U.S. PATENT DOCUMENTS

| 3,107,766 A | 10/1963 | Pritchard ...................... 192/89 |
| 4,644,823 A | 2/1987 | Mueller ...................... 74/710.5 |
| 4,712,659 A | 12/1987 | Flotow ...................... 192/13 R |
| 4,848,549 A | 7/1989 | Kammler et al. ....... 192/85 CA |

FOREIGN PATENT DOCUMENTS

| DE | 3839787 A1 | 6/1989 |
| DE | 19848582 A1 | 4/2000 |
| EP | 0321335 | 12/1988 |

OTHER PUBLICATIONS

European Search Report, International Application No. 04075336.0–1523–; International Filing Date Feb. 4, 2004.

*Primary Examiner*—Dirk Wright
(74) *Attorney, Agent, or Firm*—Howard & Howard (57) ABSTRACT

A drive axle assembly (10) includes a carrier (24) for supporting a differential case (22) with axle shafts (14, 16) extending therethrough and rotatable with the differential case (22) relative to the carrier (24). A plurality of friction discs (74, 76) are disposed within the differential case (22) and are alternatively connected to the differential case (22) and a drive hub (78), which is connected to one of the axle shafts (14). A sleeve (100) is operably connected to a piston (90) for generating a thrust force and for transmitting the thrust force through the sleeve (100) to move the friction discs (74, 76) closer together. A plurality of levers (104) are operably connected one with the other and disposed between the sleeve (100) and the friction discs (74, 76) to amplify the thrust force of the sleeve (100).

32 Claims, 8 Drawing Sheets

DIFFERENTIAL LOCKING MECHANISM FOR A DRIVE AXLE ASSEMBLY

RELATED APPLICATION

The subject patent application claims priority to and all the benefits of U.S. Provisional Patent Application Ser. No. 60/445,171 filed on Feb. 4, 2003.

FIELD OF THE INVENTION

This invention relates generally to a differential assembly for a drive axle assembly, and more particularly to a locking mechanism for the differential assembly.

BACKGROUND OF THE INVENTION

Vehicle drive axles typically include a pair of axle shafts for driving vehicle wheels. The drive axle uses a differential assembly to control input speed and torque to the axle shafts. Under ideal conditions, when the vehicle is driven along a straight path, the wheels will be turning at approximately the same speed and the torque will be equally split between both wheels. When the vehicle negotiates a turn, the outer wheel must travel over a greater distance than the inner wheel.

The differential assembly allows the inner wheel to turn at a slower speed than the outer wheel as the vehicle turns. Power is transmitted from a vehicle drive shaft to a drive pinion that is in constant mesh with a ring gear. The ring gear is bolted to a differential case that turns with the ring gear. A differential spider having four (4) support shafts orientated in the shape of a cross, has four (4) differential pinions. One differential pinion is supported for rotation on each support shaft. Power is transferred from the differential case to side gears that are splined to the axle shafts. The side gears are in constant mesh with the differential pinions. The outer ends of the axle shafts are bolted to the wheel hubs to which the wheels are mounted.

When the vehicle is driven in a straight path the ring gear, differential case, spider, differential pinions, and side gears all rotate as one unit to transfer power to the axle shafts. There is no relative movement between the differential pinions and the side gears. When the vehicle executes a turning maneuver, the differential pinion gears rotate on their respective shafts to speed up the rotation of one axle shaft while slowing the rotation of the other axle shaft.

Often the differential assembly includes a differential locking or biasing mechanism. When there are poor traction conditions, e.g., slippery or rough surfaced roads, the locking mechanism allows maximum wheel traction for improved control. If the differential assembly does not have the locking mechanism and one tire is on ice, the available traction torque on the opposite wheel is same as on the wheel on ice. Thus, the tire just spins on the ice and the vehicle is prohibited from traveling forward. The locking mechanism allows the axle shafts to rotate at the same speed while transferring most of the available torque to the tire not on the ice. If the tractive effort at this tire is sufficient, the vehicle can be moved off of the ice. When the mechanism is activated, power is transmitted through the differential gearing, and locking mechanism rather than through the differential gearing only.

One type of the locking mechanism includes a wet disc clutch that locks the differential case to the axle shafts, until a predetermined torque level is exceeded. The wet disc clutch includes a plurality of stationary discs interspersed with rotating discs in a fluid chamber. A piston applies a force to the wet disc clutch to compress the rotating and stationary discs of the wet disc clutch together to apply torque between the differential case to be locked to the axle shafts. The terms stationary and rotating applied to the disc are relative to the differential case.

One disadvantage with a typical wet disc clutch system is fluid leakage. The leakage problem results from the pressurized fluid transfer from stationary members to rotating members to actuate the piston. Complicated rotating seal units, sometimes comprising leak-by recapture circuits, must be incorporated into the differential assembly, which take up valuable packaging space and are expensive. The recapture system recovers the leaked fluid and returns it to a pump that is used for applying pressure to actuate the wet disc clutch. Another disadvantage is that the clutch torque capacity is limited by the discs and actuator assembly that can be physically fit within the differential case.

Thus, it is desirable to have a compact actuator assembly for a differential locking mechanism that can deliver significant pressure from a stationary source to a rotating source while eliminating leakage and overcoming other deficiencies in the prior art as outlined above.

SUMMARY OF THE INVENTION

A drive axle assembly includes a carrier and a differential case rotatably disposed in the carrier. A pair of axle shafts, disposed within the differential case, are rotatable relative to each other and about an axis. A drive hub is disposed about the axle shaft. A plurality of friction discs are disposed within the differential case and are alternatively connected to the differential case and the drive hub. The friction discs are adjacent one another in an alternating relationship to define a running clearance therebetween. A plate defines a plurality of levers with each lever extending radially relative to the axis between a radially inward end to a radially outward end to engage the friction discs and integrally interconnected by links adjacent radially outward ends. An actuator assembly is disposed about one of the axle shafts for engaging the levers and to force the levers into engagement with the friction discs for forcing the friction discs into engagement with one another for transmitting torque between one of the axle shafts and the differential case.

The radially inward end engages the actuator assembly and the radially outward end engages the differential case having a disc engaging portion between the radial inward and outward ends for engaging the friction discs between the radially inward and outward ends of each lever. The disc engaging portion amplifies a thrust force applied by the actuator assembly by pivoting about the engagement of the radially outward end with the differential case in response to axial movement of the radially inward end by the actuator assembly.

The present invention therefore provides a locking mechanism where an amplified thrust force is transferred from a non-rotatable piston to a plurality of friction discs. In addition, a unique lever mechanism is provided which amplifies the thrust force on the friction discs. This in turn lowers the actuation force on the differential case bearings.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
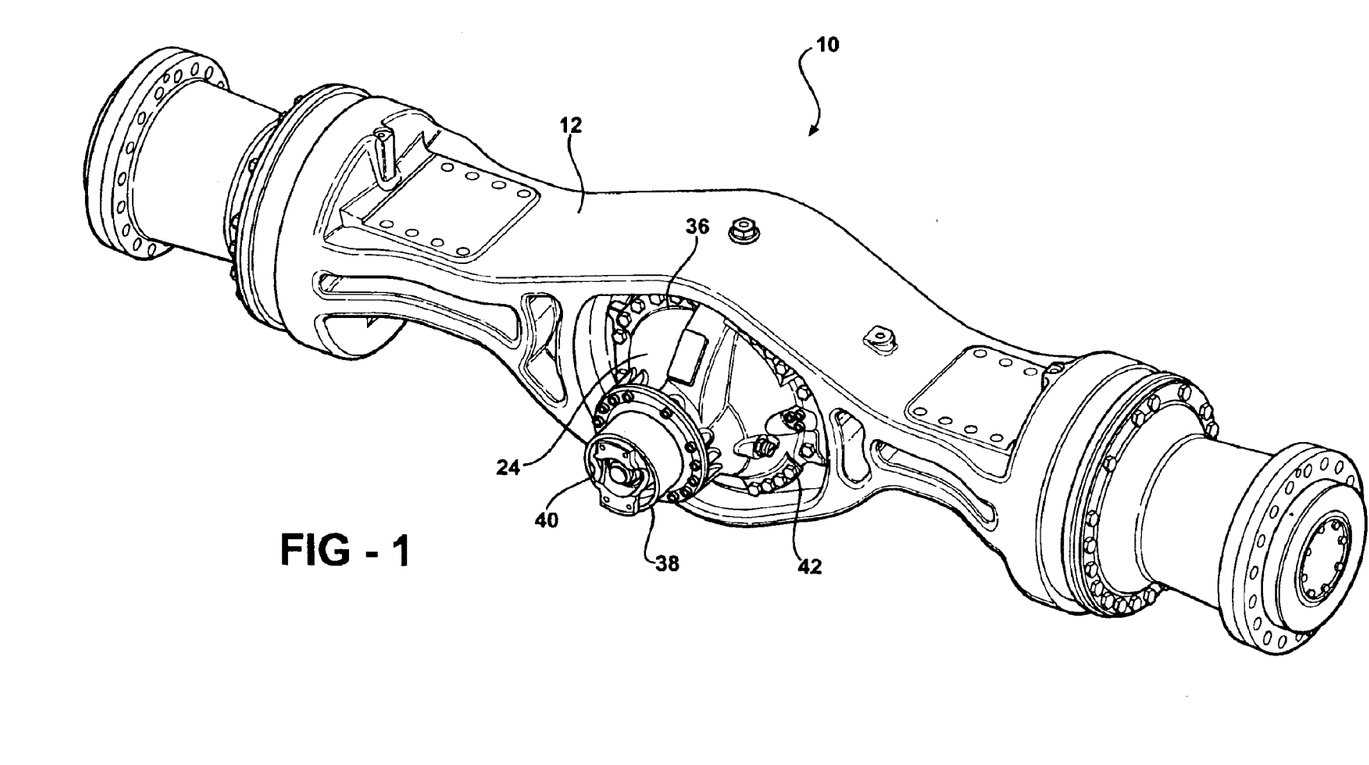
FIG. 1 is a perspective view of a drive axle assembly.

Referring to the Figures, wherein like numerals indicate like or corresponding parts, a drive axle assembly for a vehicle (not shown), is generally shown at 10 in FIG. 1. The drive axle assembly 10 transmits torque from an engine (not shown) and a transmission (not shown) to drive a pair of wheels (not shown). The drive axle assembly 10 changes direction of a power flow, multiplies torque, and allows different speeds between the wheels. The drive axle assembly 10 includes an axle housing 12, and first 14 and second 16 axle shafts, shown in FIGS. 2 and 3, for driving the wheels, extending through the axle housing 12. The drive axle assembly 10 uses a carrier 24, disposed within and supported by the axle housing 12 to transfer input speed and torque to the first 14 and second 16 axle shafts. The carrier 24 is a geared mechanism that is mounted to the axle housing 12. These types of carriers 24 are well known in the art and will not be discussed in a greater detail.

Figure 2:
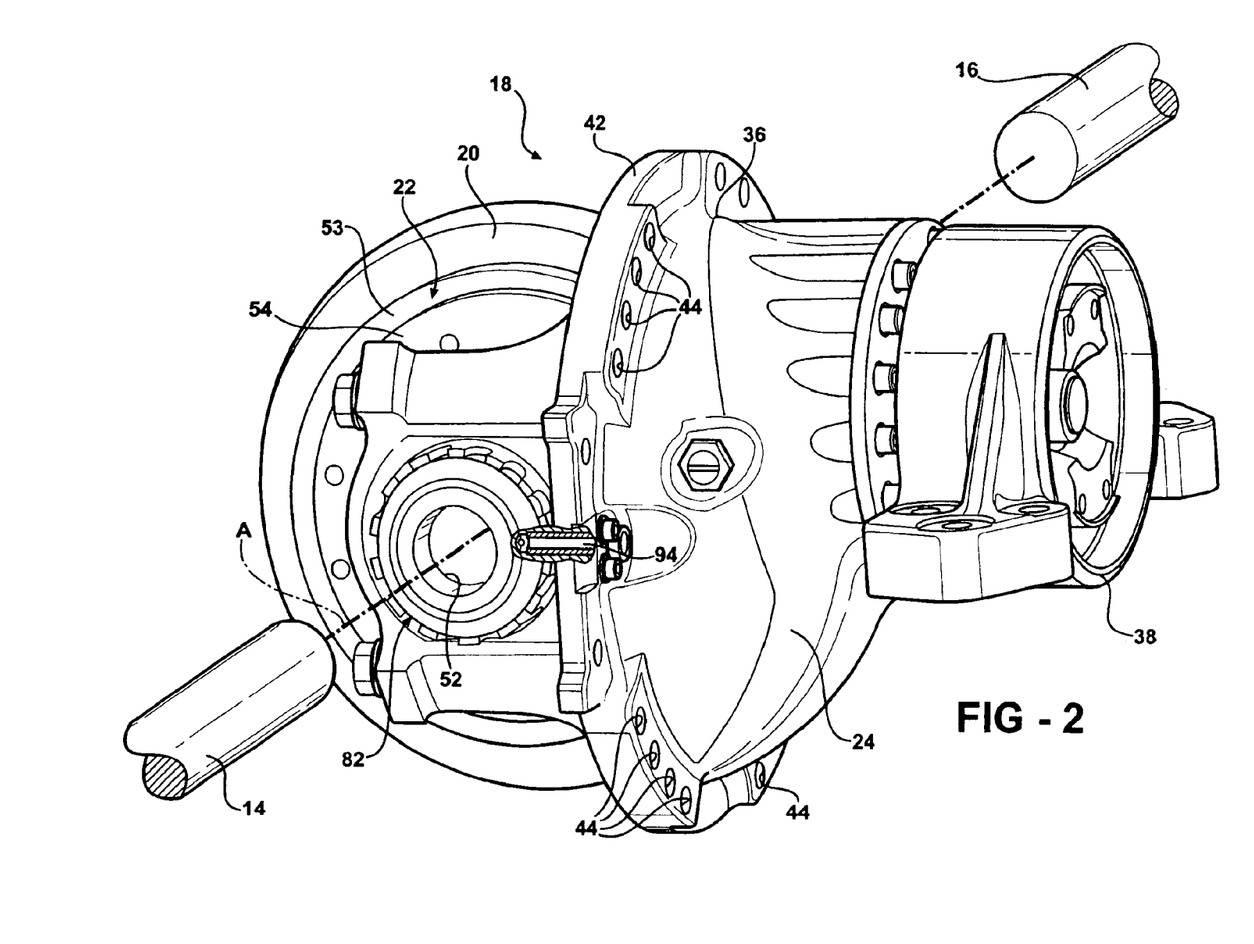
FIG. 2 is a perspective view of a differential assembly.
Figure 3:
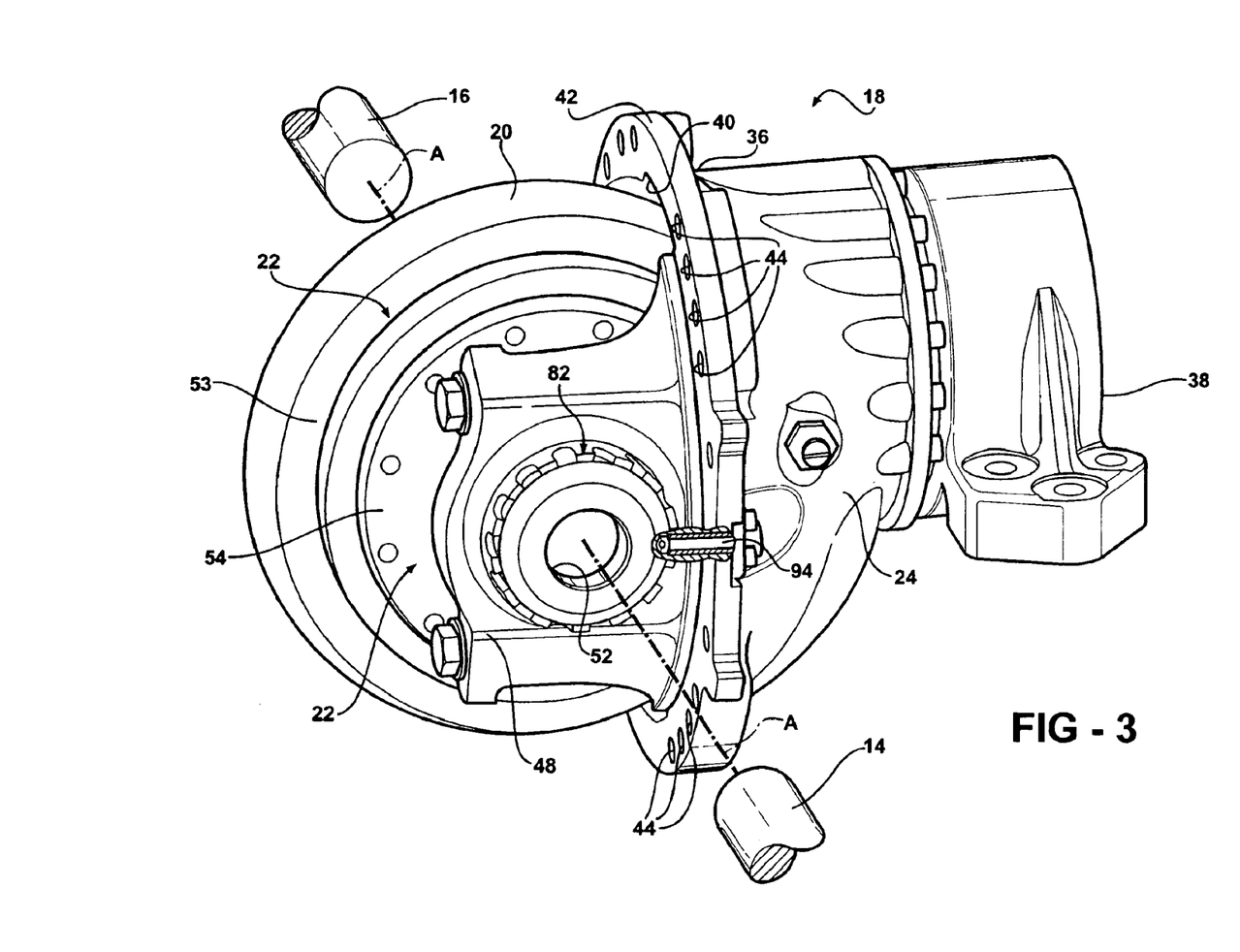
FIG. 3 is another perspective view of the differential assembly.
Figure 4:
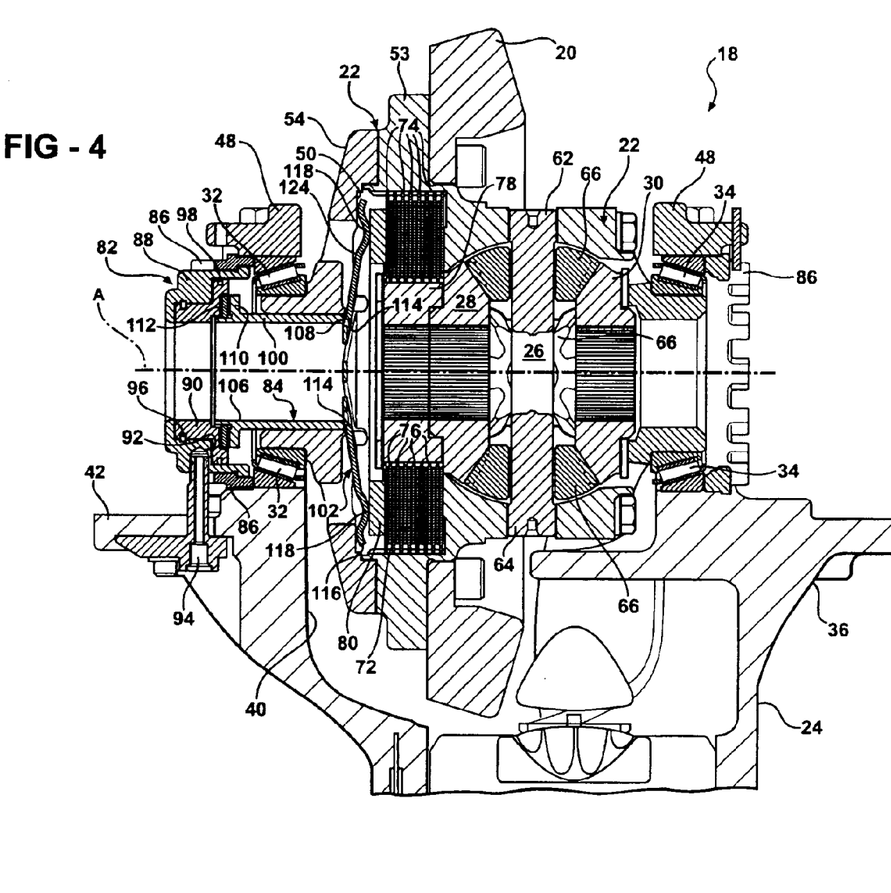
FIG. 4 is a fragmented cross-sectional view of the differential assembly.

Referring to FIGS. 2 through 4, a differential assembly 18 is mounted to the carrier 24 and is protected by the axle housing 12. The differential assembly 18 is operably connected to the first 14 and second 16 axle shafts extending therethrough. The carrier 24 has first 36 and second 38 ends and a cavity 40 defined therebetween. An annular flange 42 is integral with and extends around the first end 36. The annular flange 42 includes a plurality of holes 44 defined therein for facilitating mounting of the carrier 24 to the axle housing 12. A pair of stationary towers 48 are spaced diametrically one from another and are connected to and extend from the annular flange 42. Each stationary tower 48, includes a hole 52 defined therein to receive one of the axle shaft 14, 16 extending therethrough. The carrier 24, with the pair of the stationary towers 48, forms a fork to support the first 14 and second 16 axle shafts operably connected to the differential assembly 18. Each stationary tower 48 houses side bearings 32, 34, respectively, as best shown in FIGS. 4 and 5, for facilitating rotational movement of a differential case 22 relative to the carrier 24.

Referring to FIGS. 4 through 7, the differential case 22 includes a fluid chamber 50 defined therein. The differential case 22 includes a first half 53 and a second half 54 interconnected to each other with the fluid chamber 50 formed therebetween. The differential case 22 rotates with the second axle shaft 16. The differential case 22 is partially disposed within the cavity 40 of the carrier 24, as shown in FIG. 4, and rotates relative to the carrier 24. A ring gear 20 is mounted to the first half 53 of the differential case 22. As appreciated by those skilled in the art, power is transmitted from the engine and the transmission to the drive axle assembly 10 via a longitudinally extending driveshaft (not shown) operably coupled to a pinion gear extending through and supported in the cavity 40 of the carrier 24. The pinion gear meshes with the ring gear 20 and to transfers power to the differential case 22.

Figure 5:
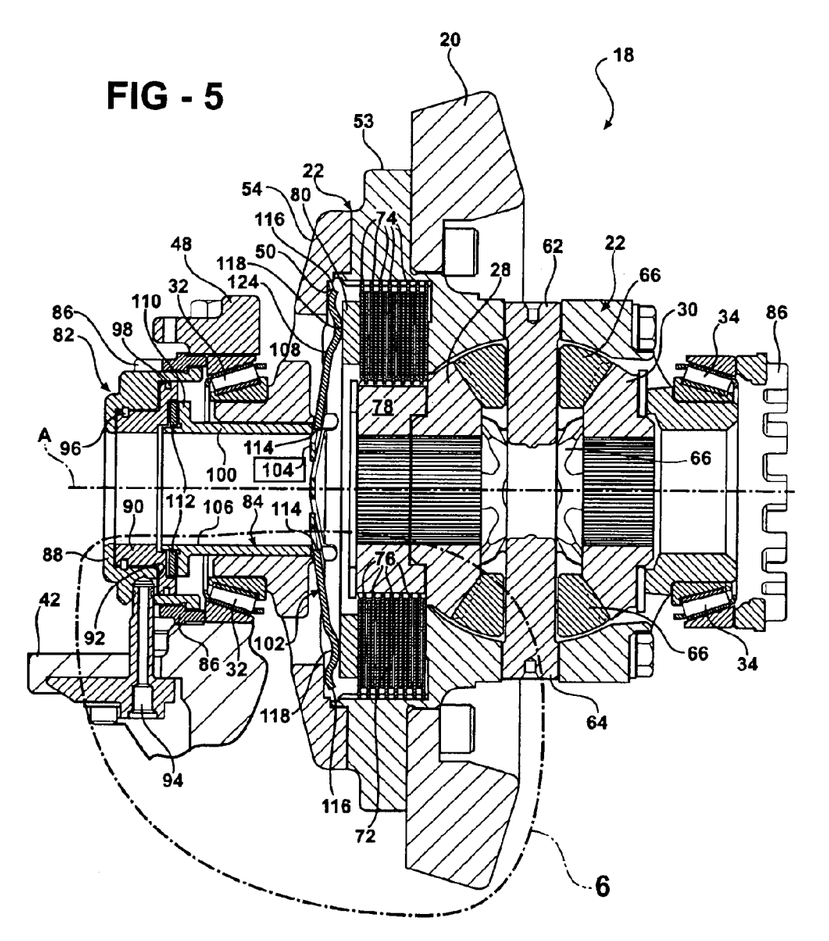
FIG. 5 is another fragmented cross-sectional view of the differential assembly.
Figure 6:
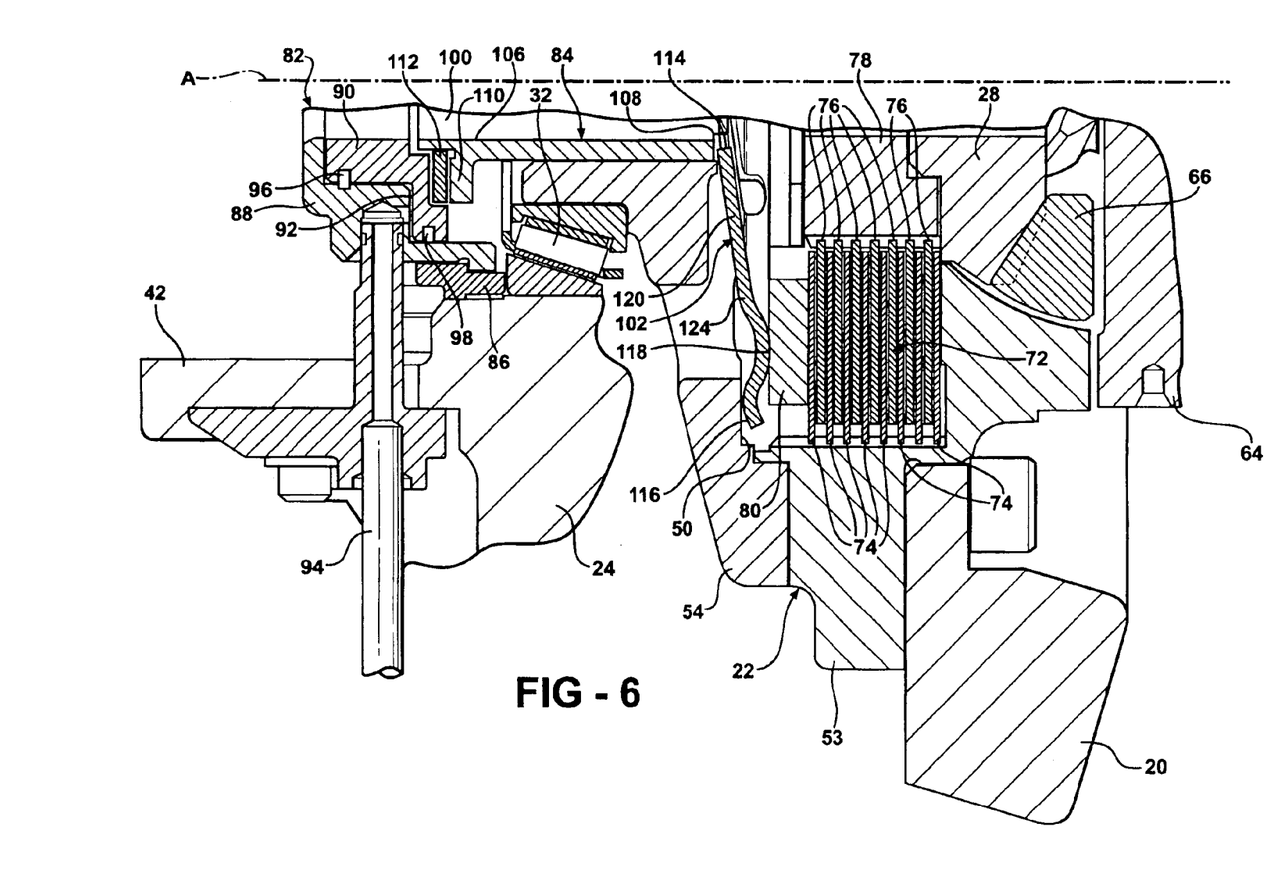
FIG. 6 is an exploded fragmentary cross-sectional view of the differential assembly of FIG. 5 shown in an deactivated mode.
Figure 7:
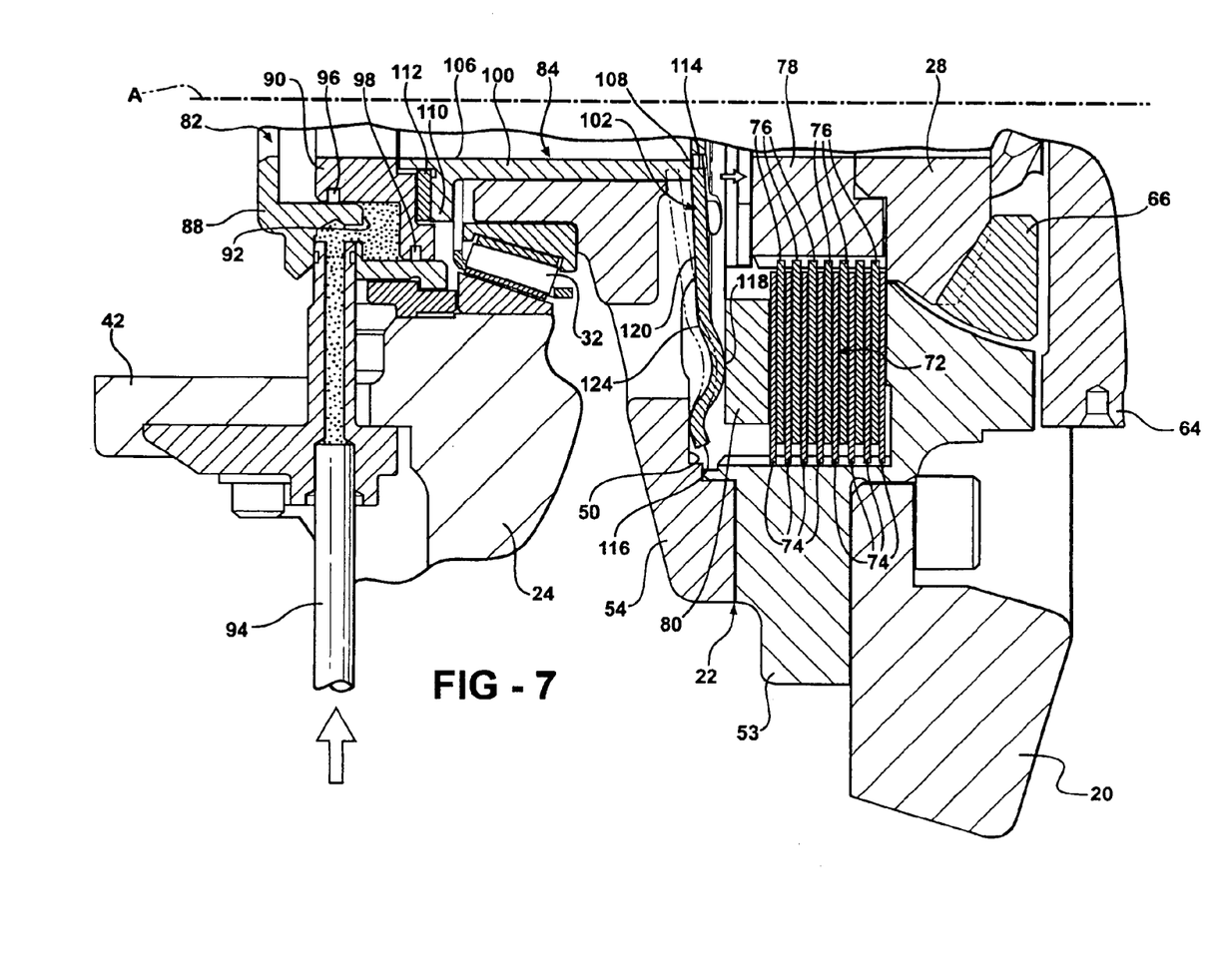
FIG. 7 is an exploded fragmentary cross-sectional view of the differential assembly of FIG. 5 shown in activated mode.

The differential assembly 18 includes a differential spider 26, as best shown in FIGS. 4 and 5, disposed in and is supported by the differential case 22. The differential spider 26 has four support shafts 62, 64. The support shafts 62, 64 are orientated in the shape of a cross. Pinion gears 66 are each supported for rotation on each of the support shafts 62, 64. Side gear 28, 30 are splined to each of the respective first 14 and second 16 axle shafts. The side gears 28, 30 are in constant mesh with the pinion gears 66. This type of differential assembly 18 is well known in the art and will not be discussed in a greater detail.

When the vehicle is driven in a straight path the differential case 22, the differential spider 26, and the pinion gears 66 all rotate as one unit to transfer power to the first 14 and second 16 axle shafts. There is no relative movement between the pinion gears 66, and the side gears 28, 30. The differential assembly 18 rotates the first 14 and second 16 axle shafts at different speeds when the vehicle turns a corner and allows both axle shafts 14, 16 to turn at the same speed when the vehicle moves in the straight path. The differential assembly 18 serves to establish a state of balance between forces between the wheels and allow the wheels to turn at different speeds when the vehicle changes direction.

The differential assembly 18 includes a locking mechanism comprising a wet disc clutch pack, generally indicated at 72, that locks the differential case 22 to the first axle shaft 14 for transmitting equal torque to the first 14 and second 16 axle shafts and the differential case 22. The wet disc clutch pack 72 is mounted within the fluid chamber 50. The wet disc clutch pack 72 has a first 74 and second 76 set of friction discs. The first 74 and second 76 sets of friction discs are adjacent one another in an alternating relationship and define a running clearance therebetween, wherein, for example, a friction disc from the first set 74 is oriented next to a friction disc from the second set 76. The first set of friction discs 74 is mounted to the differential case 22, in particular to the first half 53 of the differential case 22. The second set of friction discs 76 is mounted to the first axle shaft 14. In particular, the second set of the friction discs 76 is operably connected to the first axle shaft 14 via a drive hub 78 disposed annularly about and splined to the first axle shaft 14. A pressure plate 80, which is also disposed in the fluid chamber 50 of the differential case 22, abuts the first set of friction discs 74. The pressure plate 80 distributes a thrust force uniformly. The first set of friction discs 74 compresses with the second set of the friction discs 76 to reduce a rotational speed and to allow the differential case 22 to be locked to the first axle shaft 14.

The locking mechanism includes a stationary section generally indicated at 82 and an actuator assembly, generally indicated at 84. The actuator assembly 84 rotates relative to the stationary section 82. The stationary section 82 is operably connected and supported by one of the stationary towers 48, extending from and bolted to the annular flange 42 of the carrier 24. The stationary section 82 of the locking mechanism includes an adjusting ring 86 operably connected to the stationary tower 48 surrounding the first axle shaft 14 extending therethrough. A piston housing 88 is positioned stationary within the adjusting ring 86. A piston 90 is positioned stationary within the piston housing 88. The piston housing 88 and the piston 90 define a cavity 92 therebetween. Preferably the cavity 92 is a hydraulic cavity. A fluid input or hydraulic inlet 94 is connected to the piston housing 88 for introducing a fluid into the hydraulic cavity 92 for pressurizing the hydraulic cavity 92 thereby pushing the piston 90 away from the piston housing 88. The piston 90 applies a force to the wet disc clutch pack 72 to compress the friction discs of the first 74 and second 76 sets together to reduce rotational speed and allow the differential case 22 to be locked to the first axle shaft 14. A sealing assembly of the piston 90 includes a top seal 96 and a bottom seal 98. The sealing assembly 96, 98 is used to provide a sealed environment as fluid flows from the hydraulic inlet 94 filling the hydraulic cavity 92 between the piston housing 88 and the piston 90. The subject invention eliminates fluid leakage by utilizing a new inventive concept of the aforementioned stationary section 82 of the locking mechanism that works in conjunction with the actuator assembly 84.

The actuator assembly 84 includes a sleeve 100 that moves axially with respect to the axis A and has first 106 and second 108 ends with the first end 106 defining a lip 110. A thrust bearing 112 is positioned between the lip 110 and the piston 90 to provide a soft contact between the stationary section 82 and the actuator assembly 84. The thrust bearing 112 rotates about the axis A.

Turning to FIGS. 4 through 9, a plurality of levers 104 extend radially relative to the axis A between a radially inward end 114 to a radially outward end 116 and engage the friction discs of the first 74 and second 76 sets. Specifically, the radially inward end 114, which engages the sleeve 100, and the radially outward end 116, which engages the differential case 22, further include a disc engaging portion 118 therebetween for engaging the friction discs of the first 74 and second 76. This mechanical engagement operates as a second-class lever to amplify the thrust force applied by the sleeve 100. In particular, the lever 104 pivots about an engagement of the radially outward end 116 with the differential case 22 in response to axial movement of the radially inward end 114 by the actuator assembly. The radially outward end 116 operates as a fulcrum of the second-class lever. Each of the levers 104 includes an elongated portion 120 extending from the radially inward end 114 to the disc engaging portion 118. A length of the elongated portion 120 defines a degree of amplification of the thrust force. It is preferred that the disc engaging portion 118, or fulcrum, remain closer to the radially outward end 116 as opposed to the radially inward end 114. The level 104 are interconnected one with the another by a link 105 to form an integral of homogeneous plate 102 having a periphery in the shape of an octagon.

Figures 8, 9:
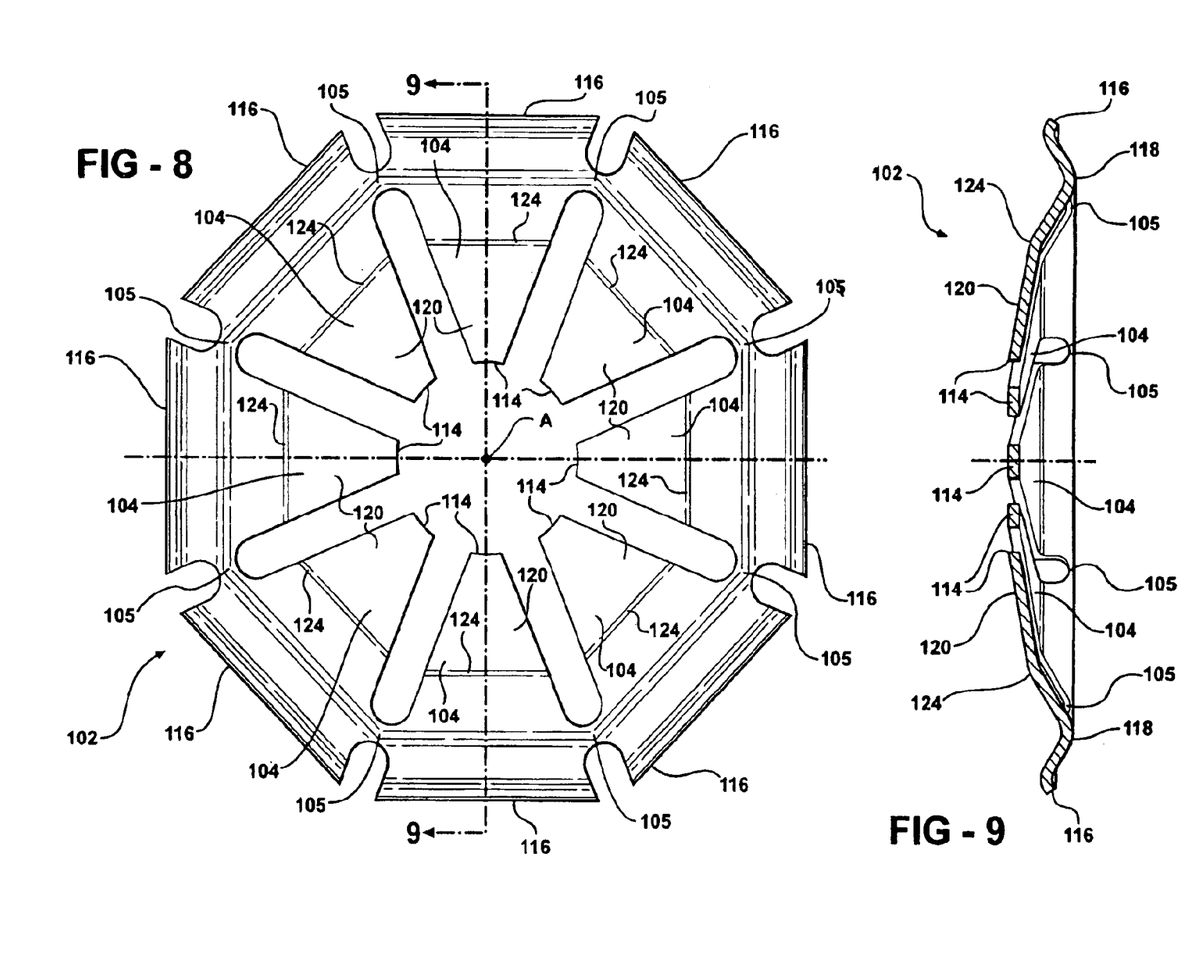
FIG. 8 is a plan view of a plurality of levers interconnected with one another to form a plate.
FIG. 9 is a cross-sectional view taken elongated line 9—9 of FIG. 8.

Referring to FIGS. 8 and 9, the disc engaging portion 118 is generally V-shaped. The radially outward end 116 slopes downwardly to the disc engaging portion 118 and then upwardly through a peak 124 to the elongated portion 120. It should be appreciated that the levers 104 may have slightly different configurations, as seen in the differences between the levers 104 shown in FIGS. 6 and 7 and the levers 104 shown in FIGS. 8 and 9.

When the hydraulic inlet 94 supplies fluid to activate the piston 90 via a fluid path, the fluid fills the hydraulic cavity 92 thereby pushing the piston 90 inwardly against the sleeve 100 which in turn pushes the sleeve 100 inwardly against the radially inward end 114 of each lever 104. The mechanical power is further distributed from the elongated portion 120 of the lever to the radially outward end 116 and back to the disc engaging surface 118 that abuts the pressure plate 80 positioned against the friction discs of the first 74 and second 76 sets. For example, a 1,000 lb. force from the sleeve 100 creates a 4,000 lb. reaction force at the radially outward end 116 which in turn creates a 5,000 lb. force at the disc engaging portion 118 acting as a lever to amplify the thrust force applied by the actuator assembly by pivoting about the engagement of the radially outward end 116 with the differential case 22 in response to axial movement of the radially inward end 114 by the sleeve 100. When the fluid escapes from the hydraulic cavity 92 toward the hydraulic inlet 94, the piston 90 moves axially to the piston housing 88 forced by the sleeve 100 biased by the radially inward end 114 of each lever 104.

While the invention has been with reference to an exemplary embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A drive axle assembly (10), comprising:
   a carrier (24);
   a differential case (22) rotatably disposed in said carrier (24);
   a pair of axle shafts (14, 16) disposed within said differential case (22) and rotatable relative to each other about an axis (A);
   a drive hub (78) disposed about one of said axle shafts (14, 16);
   a plurality of friction discs (74, 76) adjacent one another in an alternating relationship defining a running clearance therebetween and disposed within and alternatively connected to said differential case (22) and said drive hub (78);

a plate (102) defining a plurality of levers (104) each extending radially relative to said axis (A) between a radially inward end (114) to a radially outward end (116) and engaging said friction discs (74, 76) and integrally interconnected by links (105) adjacent radially outward ends (116);

an actuator assembly (84) disposed about one of said axle shafts (14, 16) for engaging said levers (104) to force said levers (104) into engagement with said friction discs (74, 76) for forcing said friction discs (74, 76) into engagement with one another for transmitting torque between one of said axle shafts (14, 16) and said differential case (22); and said radially inward end (114) engaging said actuator assembly (84) and said radially outward end (116) engaging said differential case (22) having a disc engaging portion (118) between said radially inward (114) and outward (116) ends for engaging said friction discs (74, 76) between said radially inward (114) and outward (116) ends thereof for amplifying a thrust force applied by said actuator assembly (84) by pivoting about the engagement of said radially outward end (116) with said differential case (22) in response to axial movement of said radially inward end (114) by said actuator assembly (84).

2. A drive axle assembly (10) as set forth in claim 1 wherein each of said levers (104) includes an elongated portion (120) extending from said radially inward end (114) to said disc engaging portion (118) and said links (105) adjacent thereto with a length of said elongated portion (120) defining a degree of amplification of the thrust force.

3. A drive axle assembly (10) as set forth in claim 2 wherein said disc engaging portion (118) is generally V-shaped.

4. A drive axle assembly (10) as set forth in claim 1 wherein said actuator assembly (84) includes a sleeve (100) movable axially and having first (106) and second (108) ends with said first end (106) defining a lip (110) and said second end (108) engaging said radially inward end (114) of said levers (104) with said sleeve (100) and said levers (104) rotatable about said axis (A) with said differential case (22) and at least one of said axle shafts (14, 16).

5. A drive axle assembly (10) as set forth in claim 1 wherein said levers (104) of said plate (102) define a generally polygonal configuration.

6. A drive axle assembly (10) as set forth in claim 2 wherein said radially outward end (116) slopes downwardly to said disc engaging portion (118) and then upwardly through a peak (124) to said elongated portion (120).

7. A drive axle assembly (10) as set forth in claim 4, further including a pressure plate (80) disposed annularly about said axis (A) between said disc engaging portion (118) and said friction discs (74, 76).

8. A drive axle assembly (10) as set forth in claim 1 including a piston housing (88) circumscribing at least one of said axle shafts (14, 16) and supported by said carrier (24).

9. A drive axle assembly (10) as set forth in claim 8 including a piston (90) disposed in said piston housing (88) defining a cavity (92) therebetween.

10. A drive axle assembly (10) as set forth in claim 10, wherein said piston (90) operably engages said sleeve (100) to provide the thrust force.

11. A drive axle assembly (10) as set forth in claim 10 wherein said actuator assembly (84) further includes a thrust bearing (112) coupled between said piston (90) and said sleeve (100) for isolating said piston (90) from said sleeve (100) such that any rotation of said sleeve (100) does not translate to said piston (90).

12. A drive axle assembly (10) as set forth in claim 11 including a hydraulic inlet (94) connected to said piston housing (88) for introducing a fluid into said cavity (92) for pressurizing said cavity (92) and forcing said piston (90) away from said piston housing (88).

13. A drive axle assembly (10) as set forth in claim 11 including an adjusting ring (86) operably connected to said carrier (24) and disposed annularly and stationary about one of said axle shafts (14, 16).

14. A drive axle assembly (10) as set forth in claim 1 including a ring gear (20) operably connected to said differential case (22) and rotatable about said axis (A).

15. A drive axle assembly (10) as set forth in claim 14 wherein said differential assembly (18) further includes a differential spider (26) presenting four support shafts (62, 64) orientated in the shape of a cross.

16. A drive axle assembly (10) as set forth in claim 15 wherein said differential assembly (18) further includes pinion gears (66) each supported for rotation on each of said support shafts (62, 64).

17. A drive axle assembly (10) as set forth in claim 16 wherein said differential assembly (18) further includes a pair of side gears (28, 30) presenting a meshing engagement with said pinion gears (66) and connected to each of said axle shafts (14, 16).

18. A differential assembly (18), comprising:

a differential case (22) rotatable about an axis (A);

a drive hub (78) disposed about said axis (A);

a plurality of friction discs (74, 76) adjacent one another in an alternating relationship defining a running clearance therebetween and disposed within and alternatively connected to said differential case (22) and said drive hub (78);

a plate (102) defining a plurality of levers (104) each extending radially relative to said axis (A) between a radially inward end (114) to a radially outward end (116) and engaging said friction discs (74, 76) and integrally interconnected by links (105) adjacent radially outward ends (116);

an actuator assembly (84) disposed about one of said axle shafts (14, 16) for engaging said levers (104) to force said levers (104) into engagement with said friction discs (74, 76) for forcing said friction discs (74, 76) into engagement with one another for transmitting torque between one of said axle shafts (14, 16) and said differential case (22); and said radially inward end (114) engaging said actuator assembly (84) and said radially outward end (116) engaging said differential case (22) having a disc engaging portion (118) between said radially inward (114) and outward (116) ends for engaging said friction discs (74, 76) between said radially inward (114) and outward (116) ends thereof for amplifying a thrust force applied by said actuator assembly (84) by pivoting about the engagement of said radially outward end (116) with said differential case (22) in response to axial movement of said radially inward end (114) by said actuator assembly (84).

19. A drive axle assembly (10) as set forth in claim 1 wherein each of said levers (104) includes an elongated portion (120) extending from said radially inward end (114) to said disc engaging portion (118) and said links (105) adjacent thereto with a length of said elongated portion (120) defining a degree of amplification of the thrust force.

20. A drive axle assembly (10) as set forth in claim 19 wherein said disc engaging portion (118) is generally V-shaped.

21. A differential assembly (18) as set forth in claim 18 wherein said actuator assembly (84) includes a sleeve (100) movable axially and having first (106) and second (108) ends with said first end (106) defining a lip (110) and said second end (108) engaging said radially inward end (114) of said levers (104) with said sleeve (100) and said levers (104) rotatable about said axis (A) with said differential case (22) and at least one of said axle shafts (14, 16).

22. A differential assembly (18) as set forth in claim 21 wherein said radially outward end (116) slopes downwardly to said disc engaging portion (118) and then upwardly through a peak (124) to said elongated portion (120).

23. A differential assembly (18) as set forth in claim 18 further including a pressure plate (80) disposed annularly about said axis (A) between said disc engaging portion (118) and said friction discs (74, 76).

24. A differential assembly (18) as set forth in claim 18 including a piston housing (88) and a piston (90) disposed in said piston housing (88) defining a cavity (92) therebetween.

25. A differential assembly (18) as set forth in claim 24 wherein said piston (90) operably engages said sleeve (100) to provide the thrust force.

26. A differential assembly (18) as set forth in claim 25 wherein said actuator assembly (84) further includes a thrust bearing (112) coupled between said piston (90) and said sleeve (100) for isolating said piston (90) from said sleeve (100).

27. A differential assembly (18) as set forth in claim 26 including a hydraulic inlet (94) connected to said piston housing (88) for introducing a fluid into said cavity (92) for pressurizing said cavity (92) and forcing said piston (90) away from said piston housing (88).

28. A differential assembly (18) as set forth in claim 18 further including a ring gear (20) operably connected to said differential case (22) and rotatable about said axis (A).

29. A differential assembly (18) as set forth in claim 28 further including a differential spider (26) presenting four support shafts (62, 64) orientated in the shape of a cross.

30. A differential assembly (18) as set forth in claim 29 further including pinion gears (66) each supported for rotation on each of said support shafts (62, 64).

31. A differential assembly (18) as set forth in claim 30 further including a pair of side gears (28, 30) presenting a meshing engagement with said pinion gears (66) and connected to each of said first (14) and second (16) axle shafts.

32. A differential assembly (18) as set forth in claim 24 wherein said levers (104) of said plate (102) define a generally polygonal configuration.

* * * * *

UNITED STATES PATENT AND TRADEMARK OFFICE
CERTIFICATE OF CORRECTION

PATENT NO.       : 6,991,572 B2  
APPLICATION NO.  : 10/771977  
DATED            : January 31, 2006  
INVENTOR(S)      : I-Chao Chung Page 1 of 1

It is certified that error appears in the above-identified patent and that said Letters Patent is hereby corrected as shown below:

In Column 6, line 5, delete "level", and please replace with - -levers- -.

In Column 6, line 7, delete "of" , and please replace with - - or - -.

In Column 8, line 1, delete "claim 10", and please replace with - - claim 9 - -.

In Column 8, line 16, delete "claim 11", and please replace with - - claim 12 - -.

In Column 9, line 5, delete "claim 1", and please replace with - - claim 18 - -.

In Column 9, line 5, delete "drive axle assembly (10)", and please replace with - - a differential assembly (18) - -.

In Column 9, line 11, delete "drive axle assembly (10)", and please replace with - - a differential assembly (18) - -.

Signed and Sealed this

Fifteenth Day of August, 2006

JON W. DUDAS  
*Director of the United States Patent and Trademark Office*